United States Patent
Sankaranarayanan et al.

(10) Patent No.: US 9,552,513 B2
(45) Date of Patent: Jan. 24, 2017

(54) SYSTEMS AND METHODS FOR YAW ESTIMATION

(71) Applicant: Amrita Vishwa Vidyapeetham, Kollam (IN)

(72) Inventors: Athinarayanan Sankaranarayanan, Kollam (IN); Kamal Bijlani, Kollam (IN)

(73) Assignee: Amrita Vishwa Vidyapeetham, Amritapuri, Kollam, Kerala (IN)

( * ) Notice: Subject to any disclaimer, the term of this patent is extended or adjusted under 35 U.S.C. 154(b) by 0 days.

(21) Appl. No.: 14/728,795

(22) Filed: Jun. 2, 2015

(65) Prior Publication Data

US 2015/0348257 A1      Dec. 3, 2015

(30) Foreign Application Priority Data

Jun. 2, 2014   (IN) .......................... 2698/CHE/2014

(51) Int. Cl.
*G06K 9/00*     (2006.01)
*G01B 9/02*     (2006.01)

(52) U.S. Cl.
CPC ....... *G06K 9/00335* (2013.01); *G06K 9/00228* (2013.01); *G06K 9/00268* (2013.01); *G06K 9/00214* (2013.01)

(58) Field of Classification Search
USPC ........ 382/100, 103, 106–107, 117–118, 162, 382/159, 168, 173, 181, 190–199, 209, 382/219, 232, 254, 274, 276, 286–291, 382/305, 312; 715/822; 725/28; 356/338, 356/492
See application file for complete search history.

(56) References Cited

U.S. PATENT DOCUMENTS

| | | | | |
|---|---|---|---|---|
| 2005/0180626 | A1* | 8/2005 | Moon ................ | G06K 9/00248 382/159 |
| 2013/0022263 | A1* | 1/2013 | Metaxas ............ | G06K 9/00335 382/159 |
| 2014/0022547 | A1* | 1/2014 | Knox .................... | G01N 21/49 356/338 |
| 2014/0310739 | A1* | 10/2014 | Ricci .................... | H04W 48/04 725/28 |
| 2015/0067600 | A1* | 3/2015 | Steinberg ........... | G06K 9/00208 715/822 |

\* cited by examiner

*Primary Examiner* — Seyed Azarian
(74) *Attorney, Agent, or Firm* — Convergance Intellectual Property Law P.C.; Jonathan Garfinkel

(57) ABSTRACT

Systems and methods of automatic detection of a facial feature are disclosed. Moreover, methods and systems of yaw estimation of a human head based on a geometrical model are also disclosed.

10 Claims, 12 Drawing Sheets

SYSTEMS AND METHODS FOR YAW ESTIMATION

CROSS-REFERENCE TO RELATED APPLICATIONS

This application claims priority under 35 U.S.C §119 to Indian Patent Application No. 2698/CHE/2014, filed on Jun. 2, 2014, the disclosure of which is incorporated herein by reference in their entireties.

FIELD OF THE INVENTION

The present invention is related to a system and method of yaw estimation for a head of a human. More specifically, the invention relates to system and method of yaw estimation based on a geometrical model.

DESCRIPTION OF THE RELATED ART

In a computer vision context, head pose estimation is the process of inferring the orientation of a human head from digital imagery. Head pose is described using three angles: pitch angle for vertical orientation of head (looking up or down), yaw angle for horizontal orientation of head (looking left or right) and roll angle for lateral orientation of head (tilting left or right). Among the three head pose angles (yaw, pitch, and roll), yaw angle estimation has many important applications compared to pitch and roll angles estimation. The roll angle can be easily estimated by the relative position of feature points, but the estimation of yaw and pitch angles is difficult. Considerable effort has been put in by the computer vision community to solve the head pose estimation problem.

Yaw estimation approaches have generally followed two methods. In the first, an image or images of the face and associated regions are used to generate a 3-dimensional rendition of the head, identifying the boundaries of the facial features, and thereby the orientation. In an alternative approach, the head is modeled as a vector function, onto which the coordinates of facial features identified from images of the head and face are mapped. Yaw estimation is provided by tracking the feature points using the function.

U.S. Pat. No. 8,599,266 discloses digital video imaging systems and techniques for real-time tracking of persons, face recognition of persons, monitoring and tracking head pose of a person and associated perspective view of the person. DE102011113081 discloses a method involving determining respective areas of the face to identify the position of the driver's head in the driver images.

Model based methods, unlike those based on image processing, run very fast and are suitable for real time applications. These methods are also tolerant to appearance variation between humans and do not require training with large number of images.

Nikolaidis and Pitas [2009] computed the head yaw from the distortion of the isosceles triangle formed by the two eyes and the mouth. Batista [2005] and Ji [2002] use the eye locations to fit an ellipse on the face region. Continuous yaw values are estimated from the fitted ellipse. Ohue et al. [2006] and Lee et al. [2011] do not use the eye locations, instead using the face center and face boundaries for yaw estimation. Recently, Fu et al. proposed the driver's gaze zone estimation method that employs the face center and face boundaries for the preparation of training patches. An ellipsoidal face model was introduced by Lee et al. to estimate the yaw angle. The ellipsoidal face model outperforms the cylindrical face model, as the human head is more nearly ellipsoidal in shape and not cylindrical.

Further, existing model based methods have some shortcomings. Firstly, these methods are sensitive to the misalignment of face feature points. Secondly, a single head model fails to represent all the heads exactly. Third, these methods require high image resolution and image quality. Fourth, these methods are very sensitive to partial occlusions, as some of the feature points will be lost under occluded scenarios and the pose estimate may not be computed accurately.

In critical applications such as driver inattention detection, accurate yaw angle estimation is required to provide forward collision warning. Therefore, there is a need for a system and method for determining accurate yaw angle, which can automatically and reliably detect locations of facial features.

SUMMARY OF THE INVENTION

In one aspect, a method of automatic detection of a facial feature is disclosed, comprising obtaining a human image comprising a head, a neck, and a face, modeling the human head as an ellipse in vertical projection and fixing the center of rotation of the ellipse as the center of the neck. The ellipse is truncated along the major axis representing a region of the face to an arc of ±60° and a center of the face is mapped as the projection of the nose. Boundaries of the face are then located on the ellipse by identifying coordinates on the elliptic arc subtending ±60°. Yaw angle of head rotation is then computed using the position of the nose and the boundaries of the face.

In another aspect, a method of yaw estimation of an image of a human head is disclosed. The method includes obtaining a frontal image of the human head comprising the neck and the face, modeling the human head as a truncated ellipse in vertical projection, wherein the ellipse is described by the equation $$\frac{x^2}{r^2} + \frac{(y+\delta r + \alpha r)^2}{(\beta r)^2} = 1,$$

wherein $x = r \cos t$, $y = \beta r \sin t - \alpha r$, for $t \in [0, 2\pi]$, $r$ is half of the frontal face width, $\alpha$ is a factor representing the extent of truncation, $\delta$ is a factor representing the distance of the pivot point from the center of the ellipse, and $\beta$ is the ratio of the major to the minor axis. The center of rotation of the ellipse is fixed as the center of the neck and a center of the face is mapped as a projection of the location of the nose. Yaw angle of head rotation is then computed using position of the nose and the boundaries of the face.

In yet another aspect, an operator inattention monitoring system is disclosed, comprising a processing device configured to determine an attention level of the operator. The device comprises a processor, memory and at least one communication interface, and is configured to obtain frontal images of the operator's head over a period of time. The images include the head, the neck, and the face of the operator and the processor is configured to compute a plurality of yaw angles of the operator's head from the obtained images by modeling the head as an ellipse in vertical projection. The system fixes the center of rotation of the ellipse as the center of the neck, truncates the ellipse along the major axis representing a region of the face to an arc of ±60° and maps a center of the face as the projection of the nose. Boundaries of the face are then located on the ellipse by identifying coordinates on the elliptic arc subtending ±60° and determining head rotation using position of the nose and the boundaries of the face. The processing device is further configured to analyze the plurality of yaw angles to determine the attention level of the operator.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1:
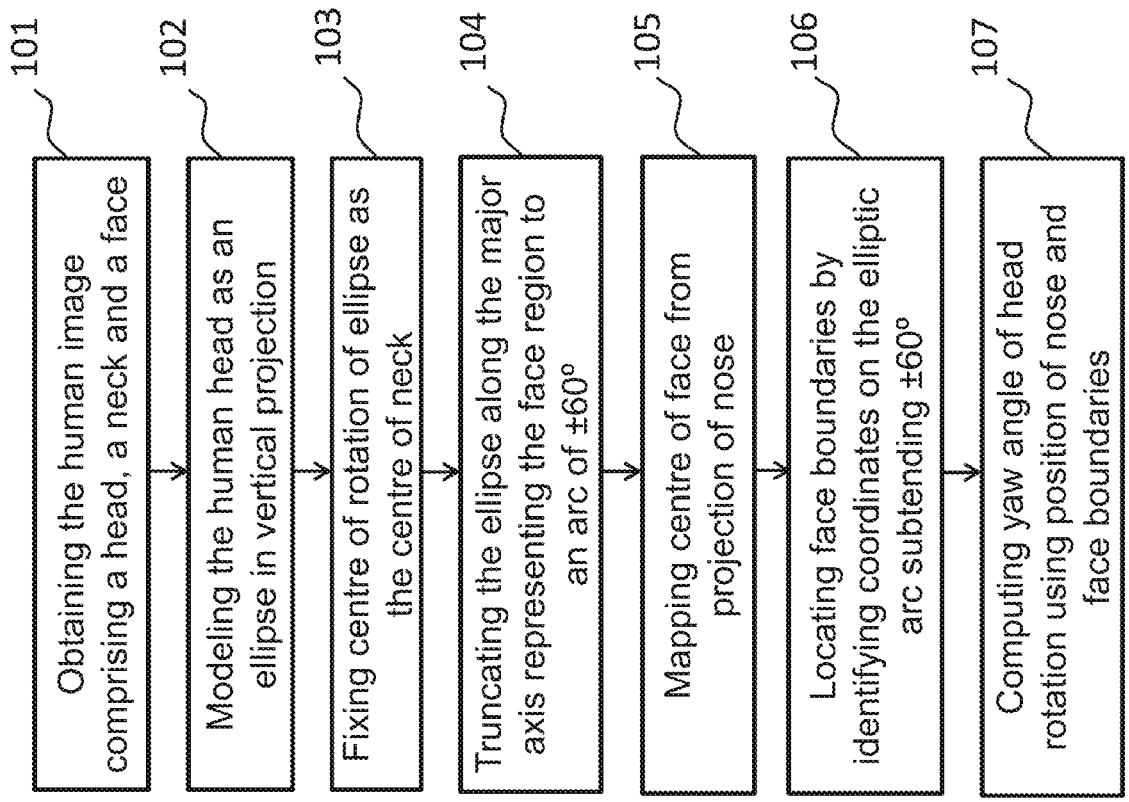
FIG. 1 represents a method of automatic detection of a facial feature.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The proposed invention relating to systems and methods of detection of facial features is further described with reference to the sequentially numbered figures.

In one embodiment, a method of automatic detection of a facial feature as shown in FIG. 1 comprises obtaining a human image comprising a head, a neck, and a face in step 101. In step 102, the human head is modeled as an ellipse in vertical projection and the center of rotation of the ellipse is fixed as the center of the neck in step 103. Step 104 involves truncating the ellipse along the major axis representing a region of the face to an arc of ±60°. In step 105, the center of the face is mapped as the projection of the nose. The boundaries of the face are then located on the ellipse by identifying coordinates on the elliptic arc subtending ±60° in step 106. Finally, in step 107, a yaw angle of head rotation is computed using the position of the nose and the boundaries of the face.

Figure 2:
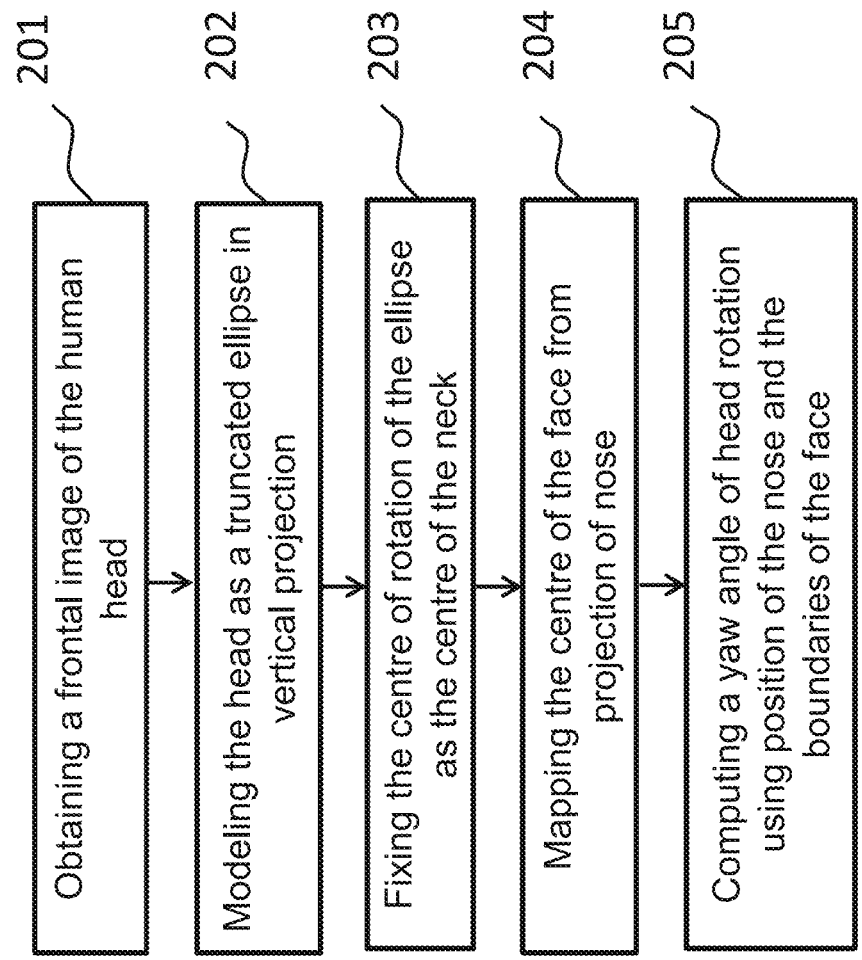
FIG. 2 represents method of yaw estimation of an image of a human head.

In one embodiment, the invention is a method of yaw estimation of an image of a human head as shown in FIG. 2, comprises of obtaining a frontal image of the human head comprising the neck and the face in step 201. In step 202, the human head is modeled as a truncated ellipse in vertical projection. The ellipse is described by the equation $$\frac{x^2}{r^2} + \frac{(y + \delta r + \alpha r)^2}{(\beta r)^2} = 1,$$

wherein x=r cos t, y=βr sin t−αr, for t∈[0, 2π], wherein r is half of the frontal face width, α is a factor representing the extent of truncation, δ is a factor representing the distance of the pivot point from the center of the ellipse, and β is the ratio of the major to the minor axis. The center of rotation of the ellipse is fixed as the center of the neck in step 203. The center of the face is mapped as a projection of the location of the nose in step 204 and computing a yaw angle of head rotation using position of the nose and the boundaries of the face in step 205.

Figure 3:
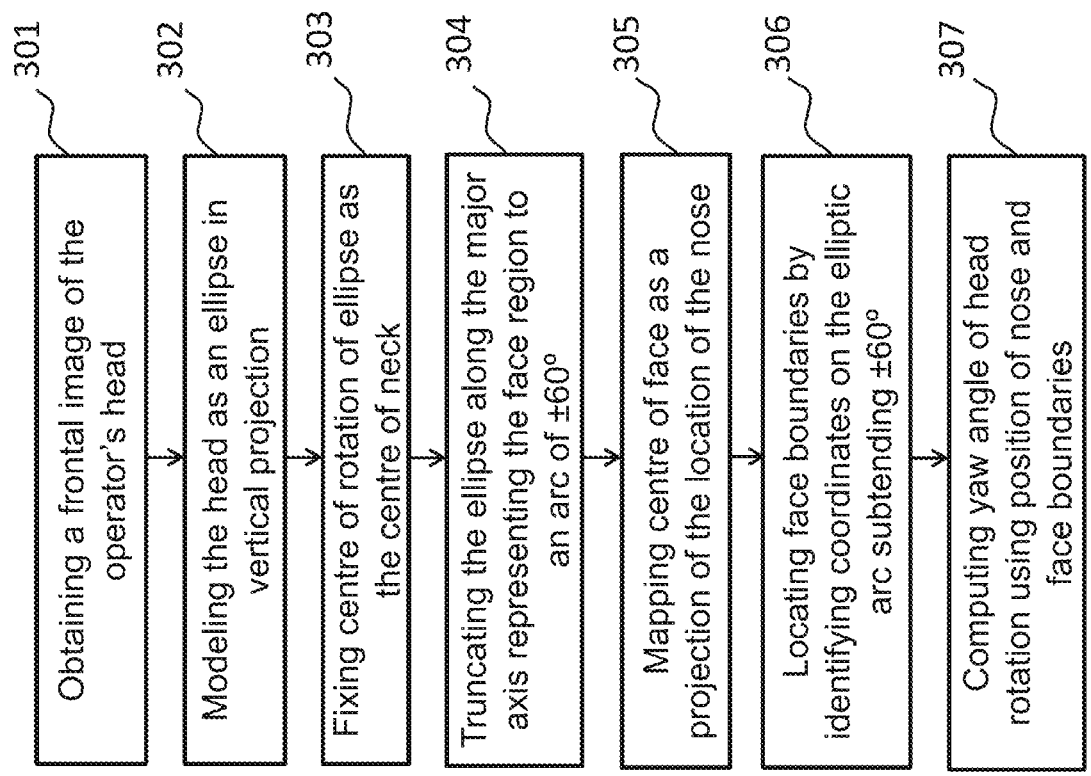
FIG. 3 represents the working of an operator inattention monitoring system.

In one embodiment, an operator inattention monitoring system as shown in FIG. 3 is disclosed. The system includes a processing device configured to determine an attention level of the operator, said device comprising a processor, memory and at least one communication interface. The processing device is configured to obtain frontal images of the operator's head over a period of time as in step 301. The images may comprise the head, the neck, and the face of the operator and the processor is configured to process the images and model the head as an ellipse in vertical projection as in step 302. In step 303, center of rotation of the ellipse is fixed as the center of the neck. The ellipse is then truncated along the major axis representing a region of the face to an arc of ±60° in step 304. In step 305, the center of the face is mapped as the projection of the nose. In step 306, boundaries of the face on the ellipse are located by identifying coordinates on the elliptic arc subtending ±60° and determining head rotation using position of the nose and boundaries of the face in step 307. The system may be further configured to analyze the plurality of yaw angles to determine the attention level of the operator.

Figure 4:
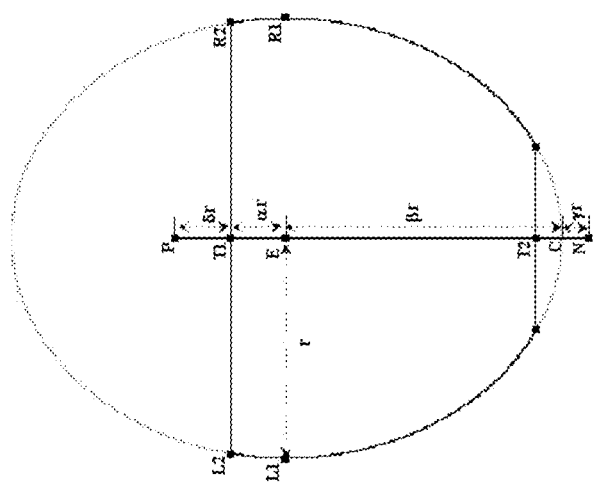
FIG. 4 shows a generic model of an elliptical face model.

In one embodiment of the invention, the elliptical model in step 102 (FIG. 1) or 302 (FIG. 3) is described by the equation $$\frac{x^2}{r^2} + \frac{(y + \delta r + \alpha r)^2}{(\beta r)^2} = 1,$$

as shown in FIG. 4. The parametric form of the equation is represented as x=r cos t, y=βr sin t−αr, for t∈[0, 2π], wherein, r is half of the frontal face width, α is a factor representing the extent of truncation, δ is a factor representing the distance of the pivot point from the center of the ellipse, β is the ratio of the major to the minor axes.

In embodiments of the invention shown in FIGS. 1 to 3, the following relations are applicable when the ellipse is rotated in the clockwise and counter-clockwise directions by a yaw angle θ, wherein the distances referenced from the center of the ellipse:

a. face center is given by $x_c = \pm(\alpha+\beta+\gamma_c)r \sin\theta$,
b. the left and right face boundaries are given by:

$$x_l = \pm(-r\sqrt{1+(\beta^2-1)\sin^2\theta}+\delta r \sin\theta + \alpha r \sin\theta)$$

$$x_r = \pm(r\sqrt{1+(\beta^2-1)\sin^2\theta}+\delta r \sin\theta + \alpha r \sin\theta)$$

c. yaw angle, $$\theta = \sin^{-1}\left\{\frac{x_c - \left(\frac{x_l+x_r}{2}\right)}{(\beta+\gamma_c)r}\right\}$$

d. half face-width, $$r = \pm\left(\sqrt{(x_r-x_l)^2 - \frac{(\beta^2-1)}{(\beta+\gamma_c)^2}\{2x_c - (x_l+x_r)\}^2}\right)$$

In embodiments of the invention shown in FIGS. 1 to 3, the following relations are applicable when the ellipse is rotated in the clockwise and counter-clockwise directions by a yaw angle θ, wherein the distances are referenced from the boundaries of the ellipse:

a. face center is given by $x_c = \pm(\alpha+\beta)r \sin\theta$
b. the left and right face boundaries are given by:

$$x_l = \pm(-r\sqrt{1+(\beta^2-\gamma_b^2-1)\sin^2\theta}+\delta r \sin\theta + \alpha r \sin\theta)$$

$$x_r = \pm(r\sqrt{1+(\beta^2-\gamma_b^2-1)\sin^2\theta}+\delta r \sin\theta + \alpha r \sin\theta)$$

c. yaw angle, $$\theta = \sin^{-1}\left\{\frac{x_c - \left(\frac{x_l+x_r}{2}\right)}{(\beta+\gamma_c)r}\right\}$$

d. half face-width, $$r = \pm\left(\sqrt{(x_r-x_l)^2 - \frac{(\beta^2-\gamma_b^2-1)}{\beta^2}\{2x_c - (x_l+x_r)\}^2}\right)$$

In various embodiments, the center of the ellipse and the left and right side boundaries of the ellipse from FIGS. 1 to 4 satisfy the relation $x_r - x_l = (x_r - x_c) + (x_c - x_l)$.

The invention is further explained in the following examples, which however, are not to be construed to limit the scope of the invention.

EXAMPLES

Figure 5B:
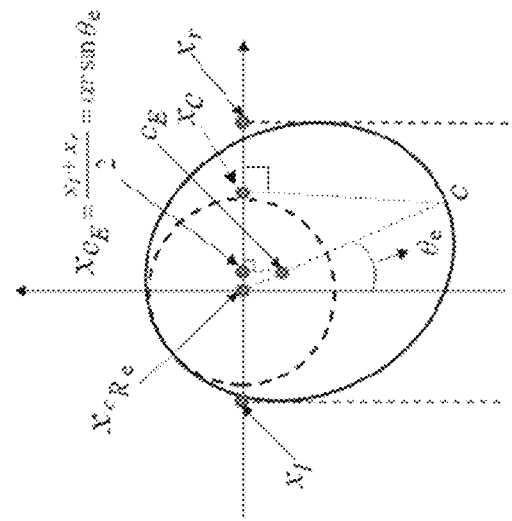
FIG. 5B shows an ellipsoidal face model at yaw angle $\theta_e$.
Figure 5A:
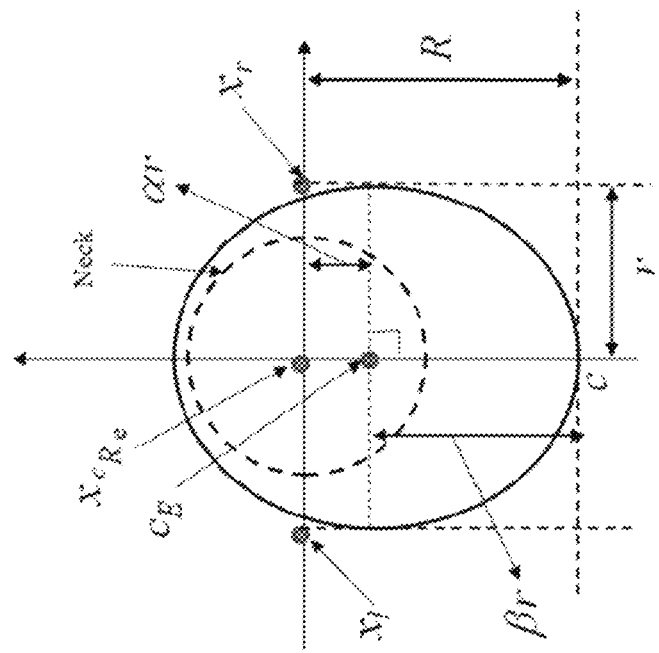
FIG. 5A shows an elliptic face model at yaw angle 0°.

In order to test the insights presented about the models, conducted two simulation experiments with reference to the FIGS. 5A and 5B. Also the performance of the proposed models on four publicly available standard head pose datasets is evaluated.

In the first simulation experiment, using the below equations, obtained $x_l$, $x_r$ and $x_c$ by varying $\theta_t$ (true yaw angle) from −90° to +90° in steps of 1°. For each value of $\theta_t$, the corresponding yaw estimates of cylindrical, ellipsoidal, CE, Center CE and Boundary CE models are computed.

$$x_l = x_{C_R} - r\sqrt{1+(\beta^2-1)\sin^2\theta_t}+\alpha r \sin\theta_t$$

$$x_r = x_{C_R} + r\sqrt{1+(\beta^2-1)\sin^2\theta_t}+\alpha r \sin\theta_t$$

$$x_c = x_{C_R} + (\alpha+\beta)r \sin\theta_t$$

An $x_{C_R}$ term is added to the expressions of $x_l$, $x_r$ and $x_c$. $x_{C_R}$ is the x-coordinate of the center of rotation in an image. We considered the image dimension as 480×640, so $x_{C_R}$ is 320. In this experiment, anthropometric parameters is set as α=0.25 and β=1.25. Half the frontal face width r (the semi minor axis of the ellipse) is set as 150 pixels.

Figure 6A:
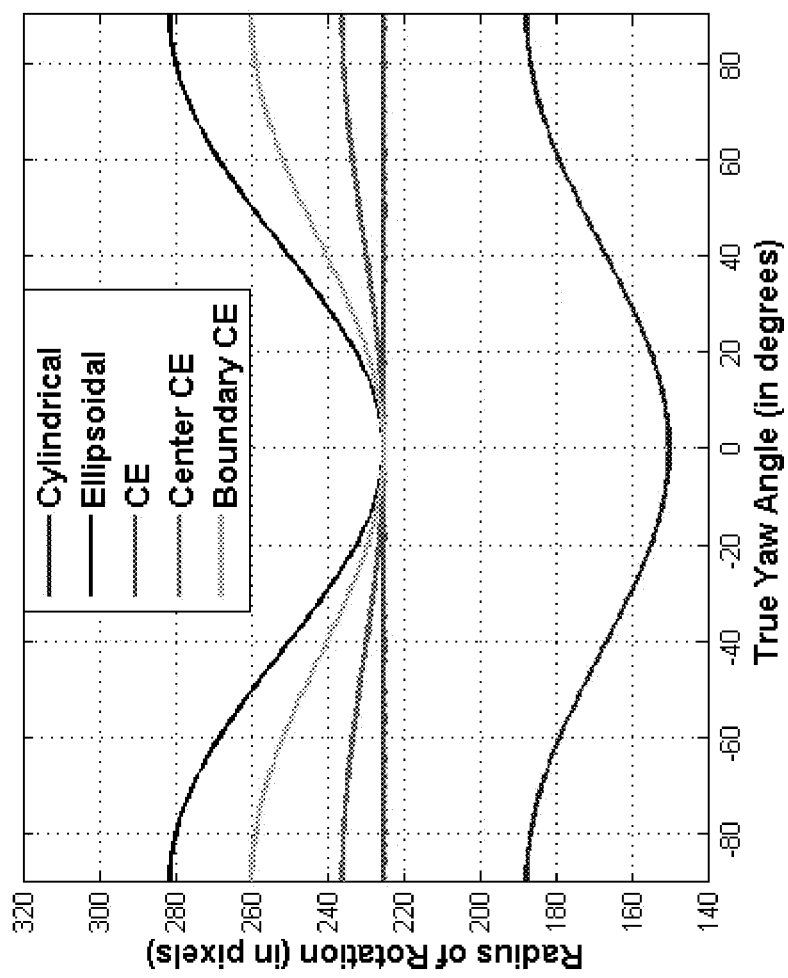
FIG. 6A shows variation of radius of rotation with yaw from experiment 1.
Figure 6B:
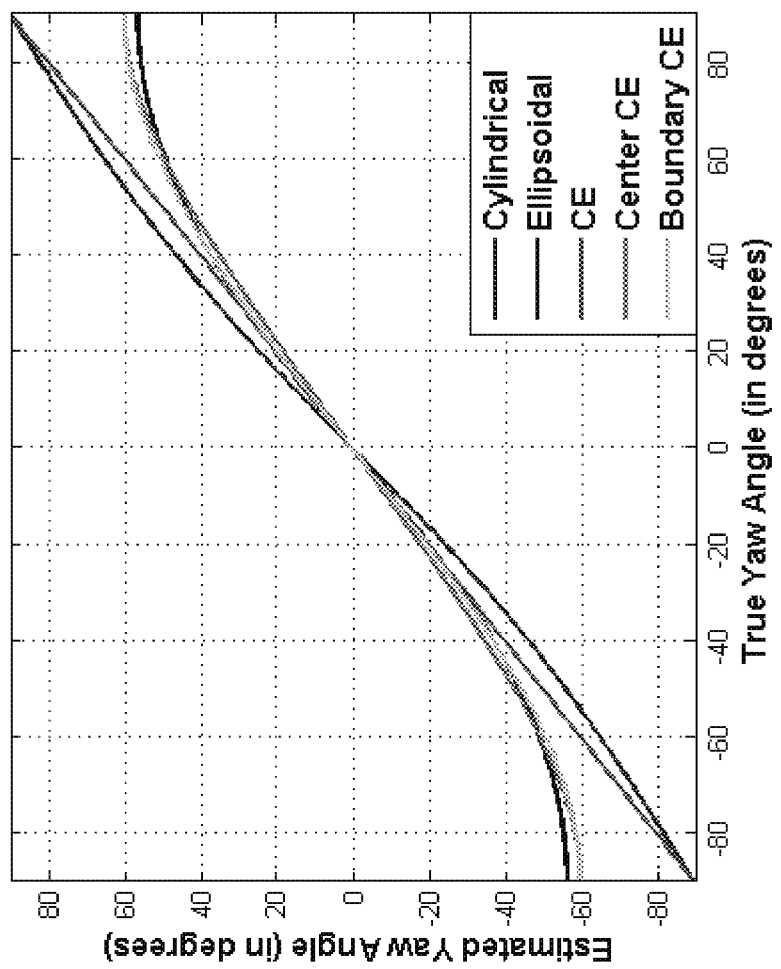
FIG. 6B shows estimated yaw angle with respect to true yaw angle from experiment 1.
Figure 6C:
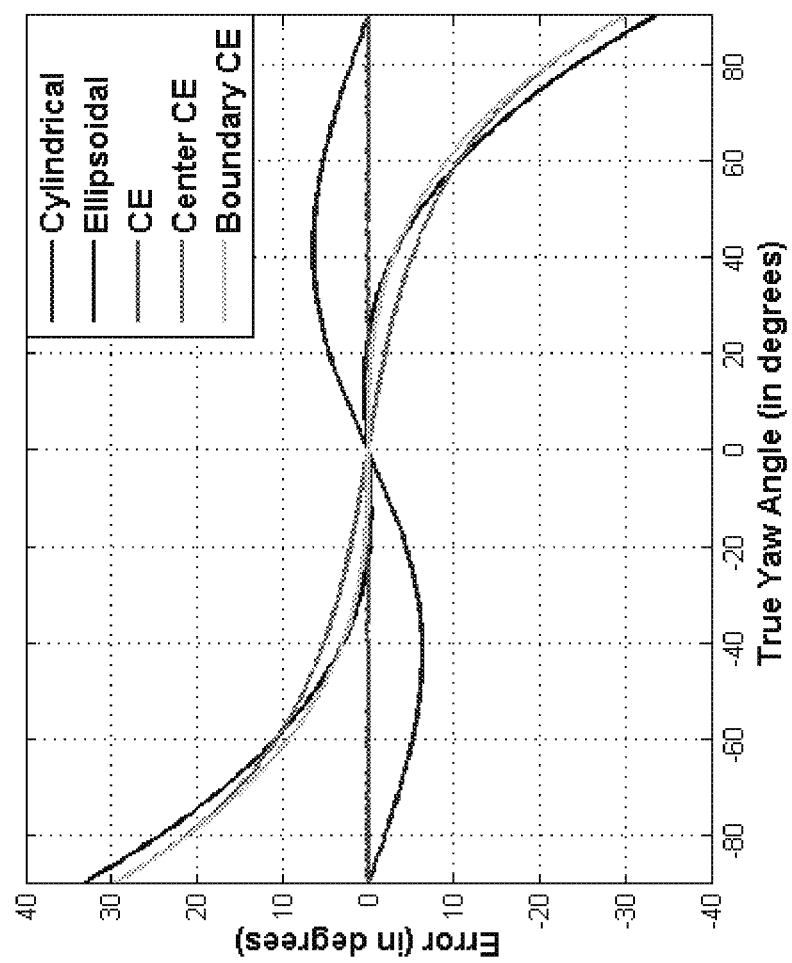
FIG. 6C shows error in estimated yaw angle with respect to true yaw angle from experiment 1.

FIG. 6A shows the variation of radius of rotation with yaw angle. It can be observed that the proposed CE model's radius of rotation is fixed throughout the span of yaw angle, whereas, the radius of rotation of other models is varying with yaw. Also, the Boundary CE model's variation of radius of rotation is larger than the Center CE model and lesser than the ellipsoidal model. The yaw estimation bounds of the cylindrical, ellipsoidal, Center CE and Boundary CE models can be verified to be correct from FIG. 6B. Also, for near frontal faces (very smaller yaw angles), all the models performs good. FIG. 6C presents the estimation error plot of different models. Three observations can be made from this plot. First, as the yaw angle increases, the estimation error of cylindrical model first increases and then decreases. Second, for larger yaw angles, the cylindrical model outperforms other models. Third, for smaller yaw angles, the error in cylindrical model's yaw estimate is greater than that of other models.

TABLE 1

Error in yaw estimation (in degrees)

| | Yaw range | | | |
| --- | --- | --- | --- | --- |
| | −90° to +90° | | −23° to +23° | |
| Model | RMSE | Max | RMSE | Max |
| Cylindrical | 4.496 | 6.379 | 3.092 | 4.95 |
| Ellipsoidal | 13.334 | 33.557 | 0.254 | 0.359 |
| CE | 0 | 0 | 0 | 0 |
| Center CE | 11.625 | 30 | 0.241 | 0.595 |
| Boundary CE | 12.174 | 30 | 1.349 | 2.386 |

Table 1 provides the RMS error and maximum error of the models for different ranges of true yaw angle. From Table 1, it is clear that the cylindrical model performs better than other models for larger head turns. Also, the proposed models and the ellipsoidal model outperform the cylindrical model for smaller head turns. For the entire yaw angle range, the RMSE of Center CE model is less than that of the ellipsoidal and Boundary CE models.

In the second simulation experiment, a 480×640 image is made with a vertical ellipse at the center of the image. The semi minor axis of the ellipse is 150 pixels (r) and the semi major axis is 187.5 pixels (βr). Another 480×640 image is made with a vertical line at the center of the image. Both the images are rotated around the anchor point (320, 202.5). The x coordinate of the anchor point is the center of the image, whereas the y-coordinate is 37.5 pixels (αr) above the center of image. Thus the yaw angle of the head orientation is simulated as the image rotation angle. The face boundaries $x_l$ and $x_r$ are obtained from the bounding box information of the rotated ellipse. The face center $x_c$ is obtained as the intersection point of rotated line image and rotated ellipse image. Thus the ellipsoidal face model is simulated through image operations. Experiments are conducted by varying the image rotation angle $\theta_t$ (true yaw angle) from $-90°$ to $+90°$ in steps of $1°$. For each value of $\theta_t$, the corresponding yaw estimates of cylindrical, ellipsoidal CE, Center CE Boundary CE models are computed.

TABLE 2

Error in yaw estimation (in degrees)

| | Yaw | | | | | |
|---|---|---|---|---|---|---|
| | $-90°$ to $+90°$ | | $-23°$ to $+23°$ | | $-80°$ to $+80°$ | |
| Model | RMSE | Max | RMSE | Max | RMSE | Max |
| Cylindrical | 4.372 | 6.671 | 3.046 | 4.901 | 4.592 | 6.671 |
| Ellipsoidal | 13.407 | 33.55 | 0.263 | 0.493 | 9.70 | 24.475 |
| CE | 0.827 | 4 | 0.117 | 0.306 | 0.446 | 1.804 |
| Center CE | 11.719 | 30 | 0.307 | 0.878 | 8.374 | 21.227 |
| Boundary | 12.289 | 30 | 1.391 | 2.653 | 9.22 | 21.474 |

Figure 7A:
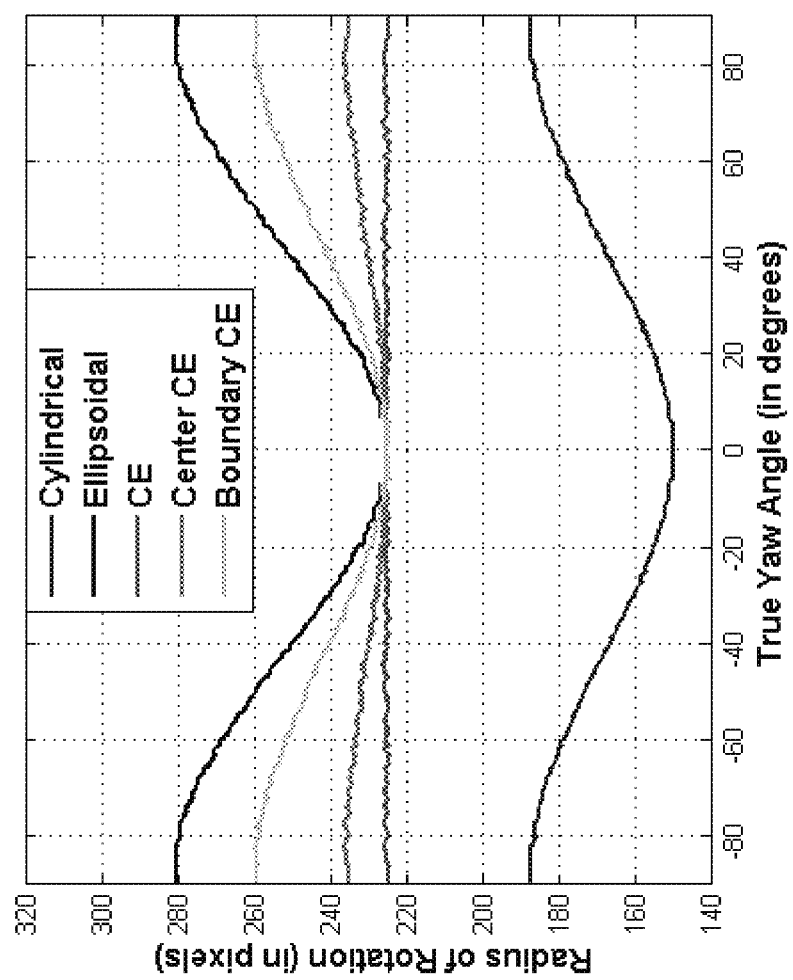
FIG. 7A shows variation of radius of rotation with yaw from experiment 2.
Figure 7B:
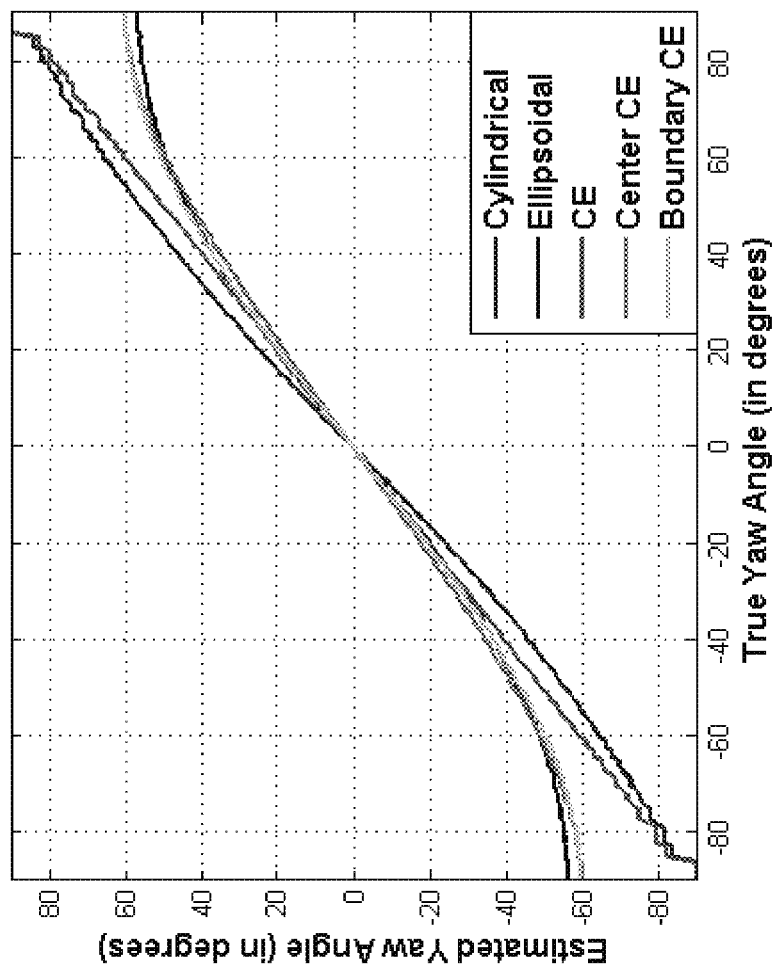
FIG. 7B shows estimated yaw angle with respect to true yaw angle from experiment 2.
Figure 7C:
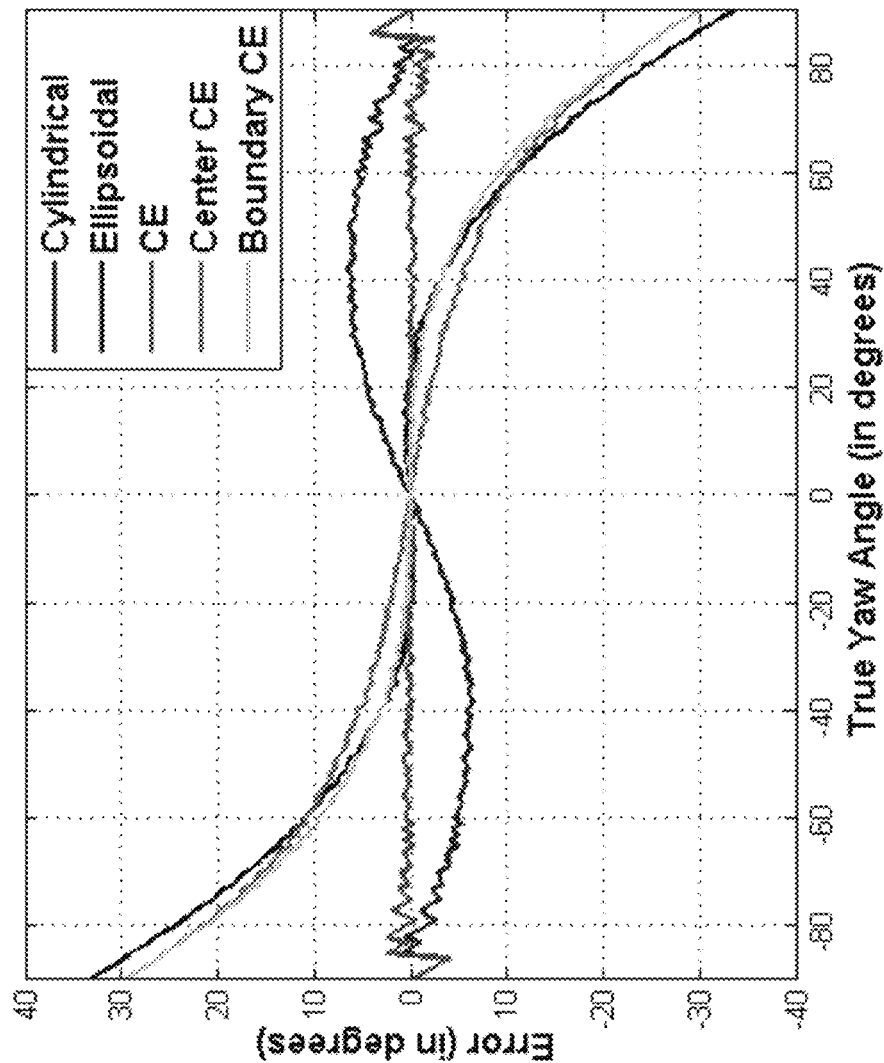
FIG. 7C shows error in estimated yaw angle with respect to true yaw angle from experiment 2.

In the second experiment, for true yaw angles above ±60°, the rounding and truncation errors are induced due to drawing ellipse in image, which impacts the estimation error in the models. FIG. 7A to 7C presents the results of experiment-2. Observations similar to FIG. 6A to 6C can be made from FIG. 7A to 7C. Table 2 provides the RMS error and maximum error of the models for different ranges of true yaw angle. Observations similar to Table 1 can be made from Table 2.

In the third experiment, conducted experiments with four standard head pose datasets which are publicly available and widely used by the research community. The datasets are: The Boston University (BU) head pose dataset contains 45 head motion videos along with their ground truth 3D head pose. In this dataset, nine different head motions were performed by five subjects. The video frame resolution in this dataset is 320×240. In this experiments, all the videos in this dataset are used. CAS-PEAL: This dataset contains face images for 21 poses combining seven yaw angles (−45°, −30°, −15°, 0°, 5°, 30° and) 45° and three pitch angles (30°, 0°, and −30°) for each of 940 subjects. The image resolution in this dataset is 480×360. In our experiments, all the images in this dataset are used.

TABLE 3

Comparison of the MAE (in degrees) on BU dataset

| Method | MAE |
|---|---|
| Cylindrical | 5.6 |
| Ellipsoidal | 4.99 |
| CE | 4.99 |
| Center CE | 4.63 |
| Boundary CE | 4.89 |

TABLE 4

Comparison of the RMSE (in degrees) on BU dataset

| Method | RMSE |
|---|---|
| Cylindrical | 7.23 |
| Ellipsoidal | 6.48 |
| CE | 6.52 |

TABLE 4-continued

Comparison of the RMSE (in degrees) on BU dataset

| Method | RMSE |
|---|---|
| Center CE | 6.04 |
| Boundary CE | 6.36 |

Figure 8:
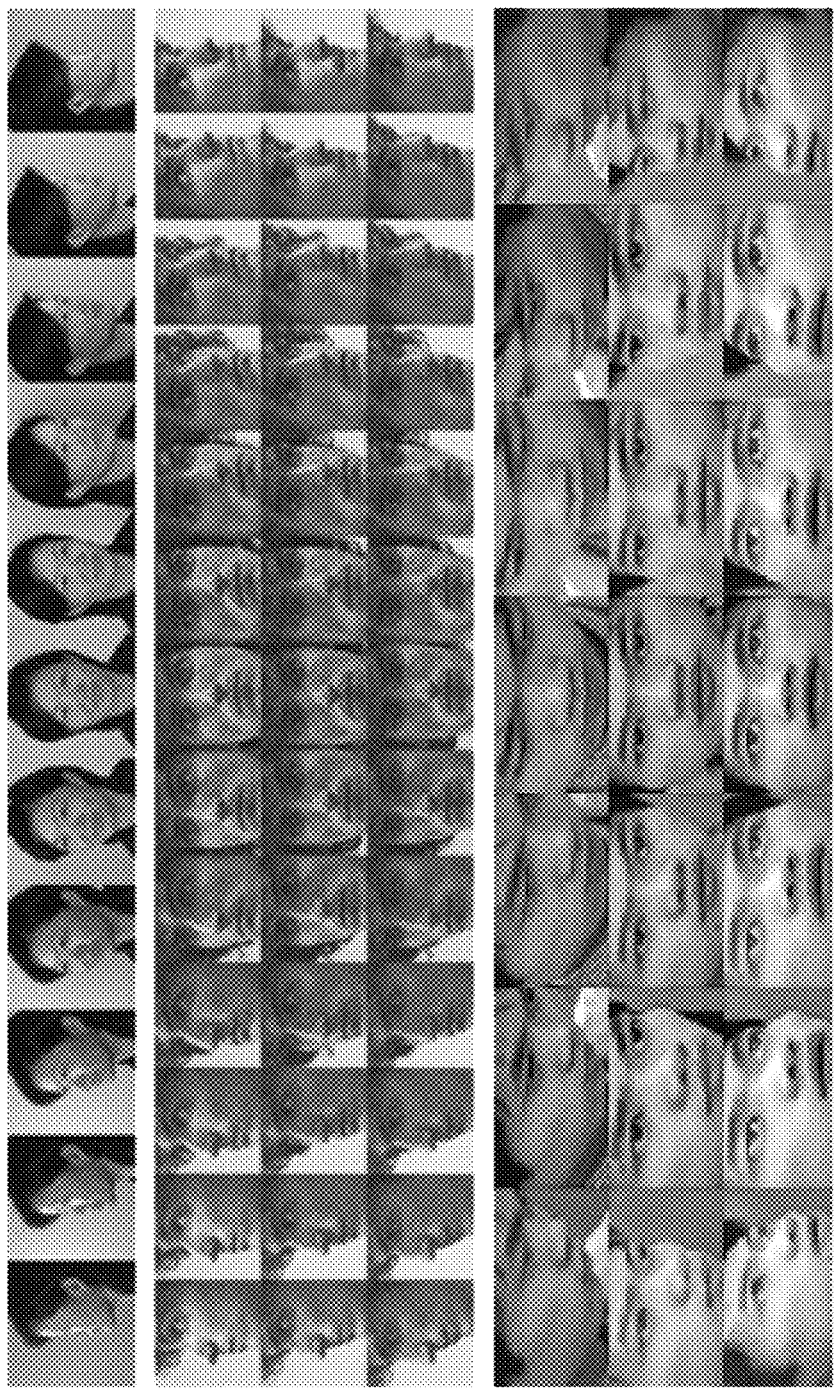
FIG. 8 shows the example images from FacePix database (top), Pointing '04 database (middle) and CAS-PEAL database (bottom).

FacePix:

This dataset contains 181 images for each of 30 subjects spanning 90° to 90° in yaw at 1° intervals. The image resolution in this dataset is 128×128. A subset of this dataset containing yaw spanning 60° to +60° is used in this experiments. Pointing '04: The Pointing '04 database contains 15 subjects, each of which has images at different poses, including 13 yaw poses and 7 pitch poses. The image resolution in this dataset is 384×288. A subset of this dataset containing yaw spanning 60° to +60° is used in this experiments. Sample images from these datasets are shown in FIG. 8. In this section, the effectiveness of the proposed models is demonstrated by comparing them with the state of the art head yaw estimation methods.

The face landmarks localization method outperforms the other state of the art landmark localization methods. In this experiment, for all the images, the face landmarks localization method is applied to locate the face boundaries and the face center. For the cylindrical, ellipsoidal and proposed models, report the results for yaw angles spanning −60° to +60° of the head turn. The proposed models' yaw estimate is independent of the pitch angle induced due to head orientation. As the pitch angle is due to vertical head orientation, it will not affect the horizontal coordinates of the face center and face boundaries, which are used in the proposed model's yaw computation.

In the BU dataset, each frame in the video is roll angle compensated (as the ground truth head roll angle is known) by image rotation. From the roll compensated frame, the face center and boundary coordinates are extracted for yaw angle computation. The accuracy of the proposed models is analyzed using the mean absolute angular error (MAE). The MAE of the proposed models in comparison with the state of the art methods published using the same BU dataset is presented in Table 3. It is shown that the proposed models provide comparable or better results with respect to the compared methods. Three observations can be made from Table 3. First, the proposed Center CE and Boundary CE models outperform the 3D model based approaches. Second, the cylindrical and ellipsoidal model's MAE values are greater than that of the Center CE and Boundary CE models. Third, both the CE model and the ellipsoidal model provide similar results. Fourth, the Center CE model outperforms the CE model and Boundary CE model.

Further, the accuracy of the proposed models is analyzed using the root mean square error (RMSE). The RMSE of the proposed models in comparison with the state of the art methods published using the same BU dataset is presented in Table 4. It is shown that the proposed models provide comparable or better results with respect to the compared methods. Four observations can be made from Table 4. First, the proposed Center CE model outperforms the method in which models the head as a 3D elliptic cylinder and utilizes the eye location information for fine tuning the estimated head pose. Second, the Center CE model is more accurate than the cylindrical, ellipsoidal, CE and Boundary CE models. Third, the Boundary CE outperforms the ellipsoidal and CE models. Fourth, the CE model's MAE lies between the MAEs of the cylindrical and ellipsoidal models.

TABLE 5

Comparison of the MAE (in degrees) on FacePix dataset

| Method | MAE |
| --- | --- |
| Cylindrical | 7.61 |
| Ellipsoidal | 5.89 |
| CE | 5.55 |
| Center CE | 5.26 |
| Boundary CE | 5.28 |

TABLE 6

Comparison of the MAE (in degrees) on Pointing '04 dataset

| Method | MAE |
| --- | --- |
| Cylindrical | 7.7 |
| Ellipsoidal | 7.07 |
| CE | 7.2 |
| Center CE | 6.82 |
| Boundary CE | 6.9 |

The effectiveness of the proposed models is compared against the state of the art manifold analysis-based head yaw estimation methods using the FacePix dataset. The MAE of the proposed models is compared in Table 5 against the published results of existing manifold analysis-based head yaw estimation methods which uses the same dataset. The results of the manifold analysis-based methods are for yaw angle spanning from −90° to +90° in Table 5. Two observations can be made from Table 5. First, the proposed models outperform the manifold analysis-based methods, cylindrical model and ellipsoidal model. Second, out of the three proposed models, the Center CE model outperforms the CE model and Boundary CE model. The effectiveness of the proposed models is compared against the state of the art head yaw estimation methods using the Pointing '04 dataset. The MAE of the proposed models is compared in Table 6 against the published results of existing head yaw estimation methods which use the same dataset. The results of the manifold analysis-based methods are for yaw angle spanning from −90° to +90° in Table 6. Three observations can be made from Table 6. First, except for the Kernel PLS method, the proposed models outperform the existing methods, cylindrical model and ellipsoidal model. Second, out of the three proposed models, the Center CE model outperforms the CE model and Boundary CE model. Third, the accuracy of CE model lies between that of the cylindrical and ellipsoidal models. The effectiveness of the proposed models is compared against the existing methods using the CAS-PEAL dataset. The MAE of the proposed models is compared in Table 7 against the published results which use the same dataset. Three observations can be made from Table 7 similar to that of Table 6. First, the proposed Center CE and Boundary CE models outperform the existing methods. Except for the ellipsoidal model, the CE model outperforms all the other existing methods in terms of MAE. Second, out of the three proposed models, the Center CE model outperforms the CE model and Boundary CE model. Third, the accuracy of CE model lies between that of the cylindrical and ellipsoidal models.

TABLE 7

Comparison of the MAE (in degrees) on CAS-PEAL dataset

| Method | MAE |
| --- | --- |
| Cylindrical | 7.2 |
| Ellipsoidal | 6.9 |
| CE | 7.0 |
| Center CE | 5.8 |
| Boundary CE | 6.4 |

TABLE 8

Comparison of the mean percentage increase in radius of rotation

| Method | FacePix | Pointing '04 |
| --- | --- | --- |
| Cylindrical | 10.38 | 17.24 |
| Ellipsoidal | 10.38 | 17.24 |
| CE | 9.03 | 13.64 |
| Center CE | 9.32 | 14.41 |
| Boundary CE | 9.89 | 16.19 |

For each of the models, the increase in radius of rotation is analyzed over the yaw span for the FacePix and Pointing '04 datasets. The ground truth radius of rotation data is obtained by measuring the frontal face width of each subject manually. For each subject, for each yaw angle, the percentage increase in radius of rotation against the ground truth data is computed. The mean of the percentage increase in radius of rotation over all the subjects, over the entire yaw span is computed and presented in Table 8. From Table 8 it is clear that the percentage increase in radius of rotation is larger for the cylindrical and ellipsoidal models compared to the proposed models. From the experiments on the four real head pose datasets, conclusions about the yaw estimation accuracy of each model based on two rules. (1) Angle rule: The face boundaries and the face center should meet nearly at the yaw angles ±60°. (2) Radius rule: The variation in the radius of rotation should be a minimum over the entire span of yaw angles.

The cylindrical and the CE models does not satisfy the angle rule, as the face boundaries and the face center of these models meets at ±90° C. The cylindrical and the ellipsoidal models violate the radius rule largely than the proposed models. As the cylindrical model does not satisfy both the rules, it gives the poor results among the models. The ellipsoidal model satisfies only the angle rule, whereas the CE model satisfies only the radius rule. From the experimental results it can be noticed that the ellipsoidal model outperforms the CE model in all the four datasets. So, the angle rule is very important to be satisfied than the radius rule. The Center CE, Boundary CE and ellipsoidal models satisfies the angle rule. The performance of these three models depends on how well they meet the radius rule.

Experimental results show that the RMS error and MAE error of the proposed models is lower than that of previous models. The evaluation using the standard head pose datasets has proven the accuracy of the proposed models, achieving a mean absolute error between 4° and 7°. The accuracy of the proposed models render them good candidates for initialization and re-initialization stages of head tracking based head pose estimation methods. The proposed models can either be used independently for head yaw estimation or in collaboration with tracking based methods.

While the above is a complete description of the preferred embodiments of the invention, various alternatives, modifications, and equivalents may be used. Therefore, the above description and the examples should not be taken as limiting the scope of the invention which is defined by the appended claims.

What is claimed is:

1. A method of automatic detection of a facial feature, comprising:
   a. obtaining a human image comprising a head, a neck, and a face;
   b. modeling the human head as an ellipse in vertical projection;
   c. fixing the center of rotation of the ellipse as the center of the neck;
   d. truncating the ellipse along the major axis representing a region of the face to an arc of ±60°;
   e. mapping a center of the face as the projection of a nose;
   f. locating boundaries of the face on the ellipse by identifying coordinates on the elliptic arc subtending ±60°; and
   g. computing a yaw angle of head rotation using position of the nose and the boundaries of the face;
   wherein the ellipse is described by the equation $$\frac{x^2}{r^2} + \frac{(y + \delta r + \alpha r)^2}{(\beta r)^2} = 1,$$

wherein the parametric form of ellipse is x=r cos t, y=βr sin t−αr, for t∈[0, 2π], wherein, r is half of the frontal face width, α is a factor representing the extent of truncation, δ is a factor representing the distance of the pivot point from the center of the ellipse, β is the ratio of the major to the minor axes.

2. The method of claim 1, the center of the ellipse and the left and right side boundaries of the ellipse satisfy the relation $x_r - x_l = (x_r - x_c) + (x_c - x_l)$.

3. A method of automatic detection of a facial feature, comprising:
   a. obtaining a human image comprising a head, a neck, and a face;
   b. modeling the human head as an ellipse in vertical projection;
   c. fixing the center of rotation of the ellipse as the center of the neck;
   d. truncating the ellipse along the major axis representing a region of the face to an arc of ±60°;
   e. mapping a center of the face as the projection of a nose;
   f. locating boundaries of the face on the ellipse by identifying coordinates on the elliptic arc subtending ±60°; and
   g. computing a yaw angle of head rotation using position of the nose and the boundaries of the face;
   wherein the ellipse rotated in clockwise and counter-clockwise direction by a yaw angle θ from center of ellipse comprises:
   a. face center, $x_c = \pm(\alpha + \beta + \gamma_c)r \sin \theta$,
   b. face boundaries comprising left and right boundaries, $x_l = \pm(-r\sqrt{1+(\beta^2-1)\sin^2\theta} + \delta r \sin \theta + \alpha r \sin \theta)$ $x_r = \pm(r\sqrt{1+(\beta^2-1)\sin^2\theta} + \delta r \sin \theta + \alpha r \sin \theta$ c. yaw angle, $$\theta = \sin^{-1}\left\{\frac{x_c - \left(\frac{x_l + x_r}{2}\right)}{(\beta + \gamma_c)r}\right\}$$

d. half face-width, $$r = \pm\left(\sqrt{(x_r - x_l)^2 - \frac{(\beta^2 - 1)}{(\beta + \gamma_c)^2}\{2x_c - (x_l + x_r)\}^2}\right).$$

4. A method of automatic detection of a facial feature, comprising:
   h. obtaining a human image comprising a head, a neck, and a face;
   i. modeling the human head as an ellipse in vertical projection;
   j. fixing the center of rotation of the ellipse as the center of the neck;
   k. truncating the ellipse along the major axis representing a region of the face to an arc of ±60°;
   l. mapping a center of the face as the projection of a nose;
   m. locating boundaries of the face on the ellipse by identifying coordinates on the elliptic arc subtending ±60°; and
   n. computing a yaw angle of head rotation using position of the nose and the boundaries of the face;
   wherein the ellipse rotated in clockwise and counter-clockwise direction by a yaw angle θ from boundaries of ellipse comprises:
   a. face center, $x_c = \pm(\alpha + \beta)r \sin \theta$
   b. face boundaries comprising left and right boundary, $x_l = \pm(-r\sqrt{1+(\beta^2-\gamma_b^2-1)\sin^2\theta} + \delta r \sin \theta + \alpha r \sin \theta)$ $x_r = \pm(r\sqrt{1+(\beta^2-\gamma_b^2-1)\sin^2\theta} + \delta r \sin \theta + \alpha r \sin \theta$ c. yaw angle, $$\theta = \sin^{-1}\left\{\frac{x_c - \left(\frac{x_l + x_r}{2}\right)}{(\beta + \gamma_c)r}\right\}$$

d. half face-width, $$r = \pm\left(\sqrt{(x_r - x_l)^2 - \frac{(\beta^2 - \gamma_b^2 - 1)}{\beta^2}\{2x_c - (x_l + x_r)\}^2}\right).$$

5. A method of yaw estimation of an image of a human head, comprising:
   obtaining a frontal image of the human head comprising the neck and the face;
   modeling the human head as a truncated ellipse in vertical projection, wherein
   the ellipse is described by the equation $$\frac{x^2}{r^2} + \frac{(y + \delta r + \alpha r)^2}{(\beta r)^2} = 1,$$

wherein x=r cos t, y=βr sin t−αr, for t∈[0, 2π],
   r is half of the frontal face width,
   α is a factor representing the extent of truncation,
   δ is a factor representing the distance of the pivot point from the center of the ellipse, and
   β is the ratio of the major to the minor axis;
   fixing the center of rotation of the ellipse as the center of the neck;

mapping a center of the face as a projection of the location of the nose; and computing a yaw angle of head rotation using position of the nose and the boundaries of the face;

wherein the ellipse rotated in clockwise and counter-clockwise direction by a yaw angle θ from center of ellipse comprises:

a. face center, $x_c = \pm(\alpha+\beta+\gamma_c)r \sin \theta$, b. face boundaries comprising left and right boundaries, $x_l = \pm(-r\sqrt{1+(\beta^2-1)\sin^2\theta} + \delta r \sin \theta + \alpha r \sin \theta)$ $x_r = \pm(r\sqrt{1+(\beta^2-1)\sin^2\theta} + \delta r \sin \theta + \alpha r \sin \theta$ c. yaw angle, $$\theta = \sin^{-1}\left\{\frac{x_c - \left(\frac{x_l + x_r}{2}\right)}{(\beta+\gamma_c)r}\right\}$$

d. half face-width, $$r = \pm\left(\sqrt{(x_r - x_l)^2 - \frac{(\beta^2-1)}{(\beta+\gamma_c)^2}\{2x_c - (x_l + x_r)\}^2}\right).$$

6. The method of claim 5, the center of the ellipse and the left and right side boundaries of the ellipse satisfy the relation $x_r - x_l = (x_r - x_c) + (x_c - x_l)$.

7. A method of yaw estimation of an image of a human head, comprising:

obtaining a frontal image of the human head comprising the neck and the face;

modeling the human head as a truncated ellipse in vertical projection, wherein the ellipse is described by the equation $$\frac{x^2}{r^2} + \frac{(y+\delta r + \alpha r)^2}{(\beta r)^2} = 1,$$

wherein $x = r \cos t$, $y = \beta r \sin t - \alpha r$, for $t \in [0, 2\pi]$, r is half of the frontal face width, α is a factor representing the extent of truncation, δ is a factor representing the distance of the pivot point from the center of the ellipse, and β is the ratio of the major to the minor axis;

fixing the center of rotation of the ellipse as the center of the neck;

mapping a center of the face as a projection of the location of the nose; and computing a yaw angle of head rotation using position of the nose and the boundaries of the face;

wherein the ellipse rotated in clockwise and counter-clockwise direction by a yaw angle θ from center of ellipse comprises:

a. face center, $x_c = \pm(\alpha+\beta+\gamma_c)r \sin \theta$, b. face boundaries comprising left and right boundaries, $x_l = \pm(-r\sqrt{1+(\beta^2-1)\sin^2\theta} + \delta r \sin \theta + \alpha r \sin \theta)$ $x_r = \pm(r\sqrt{1+(\beta^2-1)\sin^2\theta} + \delta r \sin \theta + \alpha r \sin \theta$ c. yaw angle, $$\theta = \sin^{-1}\left\{\frac{x_c - \left(\frac{x_l + x_r}{2}\right)}{(\beta+\gamma_c)r}\right\}$$

d. half face-width, $$r = \pm\left(\sqrt{(x_r - x_l)^2 - \frac{(\beta^2-1)}{(\beta+\gamma_c)^2}\{2x_c - (x_l + x_r)\}^2}\right).$$

8. An operator inattention monitoring system, comprising:

a processing device configured to determine an attention level of the operator, said device comprising a processor, memory and at least one communication interface;

wherein the processing device is configured to obtain frontal images of the operator's head over a period of time, wherein the images comprise the head, the neck, and the face of the operator; and wherein the processing device is configured to analyze a plurality of yaw angles to determine the attention level of the operator;

wherein the processor is configured to:

compute the plurality of yaw angles of the operator's head from the obtained images by a) modeling the head as an ellipse in vertical projection;

b) fixing the center of rotation of the ellipse as the center of the neck;

c) truncating the ellipse along the major axis representing a region of the face to an arc of ±60°;

d) mapping a center of the face as the projection of a nose;

e) locating boundaries of the face on the ellipse by identifying coordinates on the elliptic arc subtending ±60°; and f) determining head rotation using position of the nose and the boundaries of the face;

wherein the ellipse rotated in clockwise and counter-clockwise direction by a yaw angle θ from center of ellipse comprises:

a. face center, $x_c = \pm(\alpha+\beta+\gamma_c)r \sin \theta$, b. face boundaries comprising left and right boundaries, $x_l = \pm(-r\sqrt{1+(\beta^2-1)\sin^2\theta} + \delta r \sin \theta + \alpha r \sin \theta)$ $x_r = \pm(r\sqrt{1+(\beta^2-1)\sin^2\theta} + \delta r \sin \theta + \alpha r \sin \theta$ c. yaw angle, $$\theta = \sin^{-1}\left\{\frac{x_c - \left(\frac{x_l + x_r}{2}\right)}{(\beta+\gamma_c)r}\right\}$$

d. half face-width, $$r = \pm\left(\sqrt{(x_r - x_l)^2 - \frac{(\beta^2-1)}{(\beta+\gamma_c)^2}\{2x_c - (x_l + x_r)\}^2}\right).$$

9. The method of claim 8, wherein the center of the ellipse and the left and right side boundaries of the ellipse satisfy the relation $x_r - x_l = (x_r - x_c) + (x_c - x_l)$.

10. An operator inattention monitoring system, comprising:
- a processing device configured to determine an attention level of the operator, said device comprising a processor, memory and at least one communication interface;
- wherein the processing device is configured to obtain frontal images of the operator's head over a period of time, wherein the images comprise the head, the neck, and the face of the operator; and
- wherein the processing device is configured to analyze a plurality of yaw angles to determine the attention level of the operator;
- wherein the processor is configured to:
- compute the plurality of yaw angles of the operator's head from the obtained images by
  - a) modeling the head as an ellipse in vertical projection;
  - g) fixing the center of rotation of the ellipse as the center of the neck;
  - h) truncating the ellipse along the major axis representing a region of the face to an arc of ±60°;
  - i) mapping a center of the face as the projection of a nose;
  - j) locating boundaries of the face on the ellipse by identifying coordinates on the elliptic arc subtending ±60°; and
  - k) determining head rotation using position of the nose and the boundaries of the face; and
- wherein the ellipse rotated in clockwise and counter-clockwise direction by a yaw angle $\theta$ from center of ellipse comprises:
  - a. face center, $x_c = \pm(\alpha+\beta+\gamma_c)r \sin\theta$,
  - b. face boundaries comprising left and right boundaries, $$x_l = \pm(-r\sqrt{1+(\beta^2-1)\sin^2\theta} + \delta r \sin\theta + \alpha r \sin\theta)$$

$$x_r = \pm(r\sqrt{1+(\beta^2-1)\sin^2\theta} + \delta r \sin\theta + \alpha r \sin\theta)$$

- c. yaw angle, $$\theta = \sin^{-1}\left\{ \frac{x_c - \left(\frac{x_l + x_r}{2}\right)}{(\beta + \gamma_c)r} \right\}$$

- d. half face-width, $$r = \pm\left( \sqrt{(x_r - x_l)^2 - \frac{(\beta^2 - 1)}{(\beta + \gamma_c)^2}\{2x_c - (x_l + x_r)\}^2} \right).$$

* * * * *